US006684242B1

(12) United States Patent
Bahlmann

(10) Patent No.: US 6,684,242 B1
(45) Date of Patent: Jan. 27, 2004

(54) CUSTOMER SELF-HELP TOOLKIT

(75) Inventor: Bruce F. Bahlmann, White Bear Lake, MN (US)

(73) Assignee: MediaOne Group, Inc., Englewood, CO (US)

(*) Notice: Subject to any disclaimer, the term of this patent is extended or adjusted under 35 U.S.C. 154(b) by 0 days.

(21) Appl. No.: 09/562,168

(22) Filed: May 2, 2000

Related U.S. Application Data

(63) Continuation-in-part of application No. 09/344,715, filed on Jun. 25, 1999, now Pat. No. 6,546,392.

(51) Int. Cl.[7] .......................... G06F 15/177; G06F 9/44

(52) U.S. Cl. ....................................... 709/222; 717/121

(58) Field of Search ............................ 379/15; 709/201, 709/222, 224; 375/220; 707/102; 713/2; 717/169

(56) References Cited

U.S. PATENT DOCUMENTS 5,818,871 A * 10/1998 Blakeneyl et al. .......... 375/220
5,881,131 A * 3/1999 Farris et al. .................. 379/15
5,884,073 A * 3/1999 Dent ............................ 713/2
5,933,646 A * 8/1999 Hendrickson et al. ...... 717/169
6,148,337 A * 11/2000 Estberg et al. .............. 709/224
6,256,635 B1 * 7/2001 Arrouye et al. ............. 707/102
6,330,586 B1 * 12/2001 Yates et al. ................. 709/201
6,345,294 B1 * 2/2002 O'Toole et al. ............. 709/222
6,546,392 B1 * 4/2003 Bahlmann ...................... 707/9
6,578,042 B2 * 6/2003 Arrouye et al. ............. 707/102

* cited by examiner

*Primary Examiner*—Meng-Al T. An
*Assistant Examiner*—Dustin Nguyen
(74) *Attorney, Agent, or Firm*—Brooks Kushman P.C.

(57) ABSTRACT

A method for preparing a computer for service activation with a network service provider. A pre-qualifying routine is executed on the computer to gather information about the computer's initial configuration setting. A diagnostic routine is executed on the computer to test the hardware components involved in network services. If the initial configuration setting and test results meet or exceed predetermined requirements, then service software applications programs are installed in the computer and programmable configuration settings are updated. The computer then transfers a copy of the final configuration settings and test results to the network service provider where the information is stored for future reference.

18 Claims, 8 Drawing Sheets

CUSTOMER SELF-HELP TOOLKIT

CROSS-REFERENCE TO RELATED APPLICATIONS

This application is a continuation-in-part of U.S. patent application Ser. No. 09/344,715 filed Jun. 25, 1999, now U.S. Pat. No. 6,546,392.

TECHNICAL FIELD

The present invention relates to the field of preparing computers for network service activation with a network service provider.

BACKGROUND ART

Internet Service Providers (ISP), Multiple Subscriber Organizations (MSO), and other types of network service providers, expend a considerable amount of resources acquiring, installing, and maintaining network services to registered users. Millions of dollars worth of equipment and hundreds to thousands of miles of cabling must be purchased, installed, and connected to the computers of the network service provider's users in order to provide those users with Internet access. Many technicians are also employed to connect the user's computers to the network, to maintain those connections, and to maintain any associated equipment of the network. In all, a great deal of time and expense are required to make Internet access a convenient and reliable service to the users.

One problem facing network service providers is that the network services they provide are dependent upon the equipment owned by the users, specifically the user's personal computers. This is equipment that the network service provider cannot control. Considerable money and manpower can be expended attempting to activate network service for inadequate or broken equipment. Sales representatives often spend many hours talking to the users in an attempt to pre-qualify the user's computer before activating network services. Today, the sales representatives must determine manually if a user's computer meets minimum requirements. This means longer talk times and thus less time available to close additional sales calls. Once the user's computer is pre-qualified verbally, a network service provider technician is usually dispatched to the user's location to perform installations and adjustments necessary to configure the computer hardware and software for network service activation. Sometimes the technician finds that while the user's equipment meets the minimum requirements, a key element of the equipment is nonfunctional. This adds delays to the service activation process costing the network service provider more money, and generating negative customer satisfaction for the user.

It would be more efficient if it were known whether or not the user's equipment met the minimal requirements before a sales representative spends considerable time talking to the user, or a technician is sent to the user's location to perform an installation. If it was known where the user's equipment is deficient, then the user could be advised to repair/upgrade his equipment before any more time is spent by the network service provider personnel. Furthermore, once the user has activated service, it would be helpful to the network service provider to know what types of equipment the users owned, how that equipment is configured, and any problem histories. A technician with prior knowledge that a user's Ethernet card has been experiencing high error rates can usually implement repairs quickly and efficiently. Otherwise, the technician must go to the user's location prepared for the most probable problems with the most probable equipment and the most probable spare parts. If the problem is not typical, then a second service call will be required to implement repairs of the problem isolated on the first service call. In general, the network service provider could provide more efficient service if more were known about the user's equipment from the first day of network service activation and forward.

DISCLOSURE OF INVENTION

The present invention is a method, and an information recording media recording a computer program that implements the method, for preparing a computer for network service activation with a network service provider. This method provides a simple approach by which a user may pre-qualify his computer before requiring a visit from technicians of the network service provider. In some situations, the method may allow the user to activate network services without requiring any involvement from the network service provider's personnel.

The user initiates the method by executing the computer program on his computer. The computer program first queries the computer to gather information concerning predetermined configuration requirements. Examples of configuration requirements include the type and version of operating system being used by the computer, free space available on a storage drive accessible to the computer, amount of random access memory installed, and the presence of network interface hardware. An initial configuration setting for the computer is produced from this information. Analysis of the initial configuration setting is then performed to determine if the computer is capable of service activation with the network service provider.

If the initial configuration setting meets minimal requirements, then various hardware items of the computer are tested to produce a test result. Analysis of the test result determines if the computer is capable of service activation with the network service provider.

If the computer passes the tests, then a network related program is installed into the computer. The network related program enables the computer to activate service with the network service provider via the network. Updates are made to the initial configuration settings, as necessary, in connection with the network related program installation to produce a final configuration setting. The final configuration setting is then transferred across the network to the network service provider where it is preserved within a customer service system for future reference.

A copy of the initial configuration setting may be stored within the computer. This copy provides the user with a snapshot of the configuration settings prior to executing the computer program. It also provides a convenient reference for restoring the configuration settings should the user decide not to activate service, or having already done so, decides to cancel service and restore the configuration settings.

A copy of the test result produced during preparation of the computer may also be transferred to the network service provider. The test result is also preserved in the customer service system for future reference. Any subsequent testing performed by the user may also be gathered and automatically transferred to the network service provider to build a history of the computer hardware's health.

Accordingly, it is an object of the present invention to provide a method for preparing a computer for service activation with a network service provider.

Another object of the present invention is to provide an information recording medium recording a computer program that is readable and executable by the computer to prepare the computer for service activation with the network service provider.

These and other objects, features and advantages will be readily apparent upon consideration of the following detailed description in conjunction with the accompanying drawings.

BEST MODE FOR CARRYING OUT THE INVENTION

An Internet Architecture Board (IAB) defines the Internet standards used below in Standard protocols (STD) and Request For Comments (RFC) documents.

Figure 1:
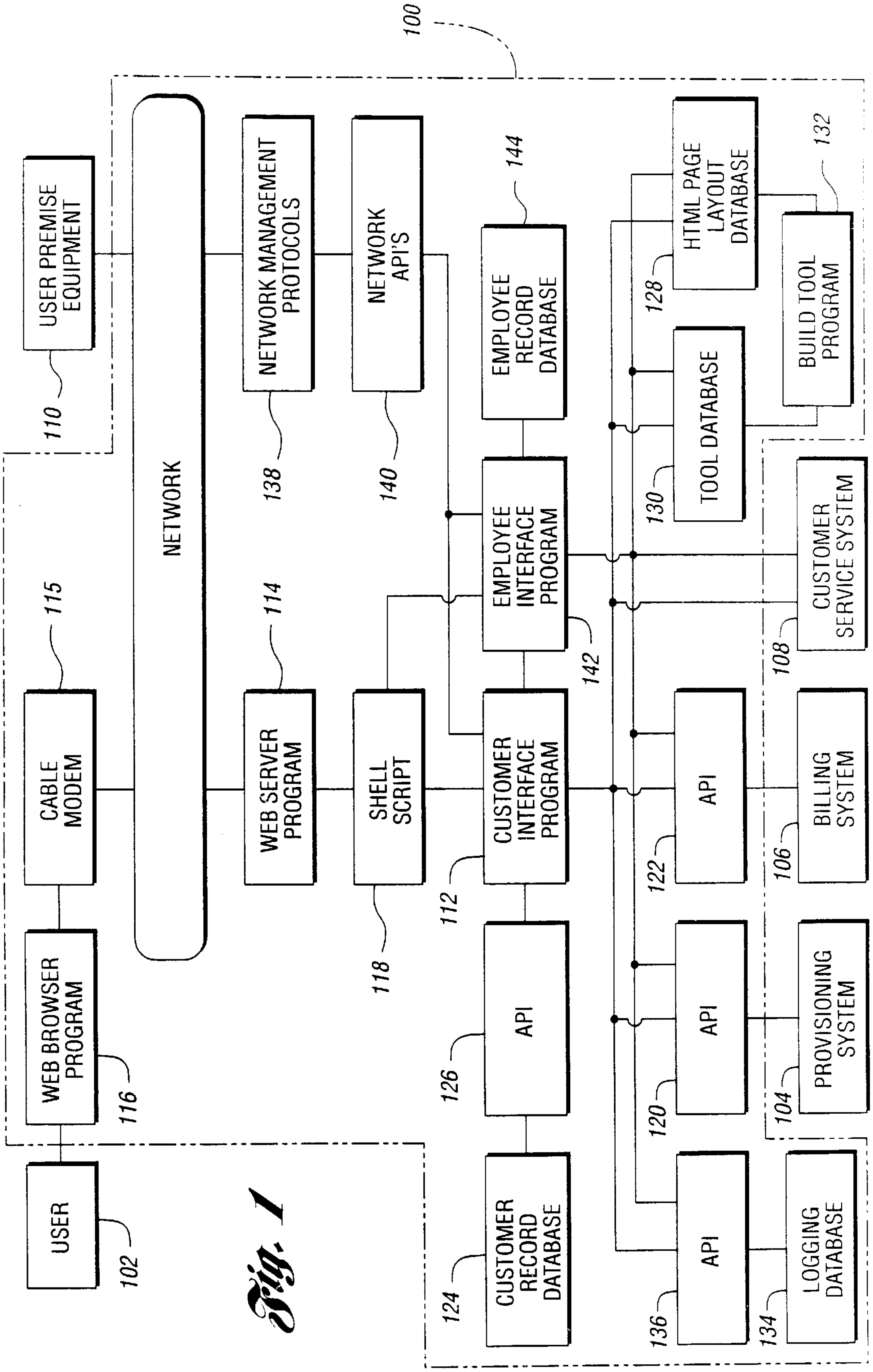
FIG. 1 is a block diagram of the software programs within a self-service gateway.

Referring to FIG. 1, the present invention operates in connection with a self service gateway 100 that provides users 102 with access to services provided by a provisioning system 104, accounts in a billing system 106, and a customer service system 108 of a Multiple Subscriber Organization (MSO) company. The self service gateway 100 also provides the users 102 with access to user premise equipment 110 at the user's own location. The user premise equipment 110 may include equipment such as cable modems for computer network operations, set-top-boxes for video services, network interface units for telephony services, and any other device that can communicate with a computer.

At the core of the self service gateway 100 is a customer interface program 112. This program is one or more state machine software programs that step user 102, who are customers of the MSO company, through various on-line operations to view, add, delete, modify and replace parameters, accounts, filters, and similar information controlled by the provisioning system 104 and the billing system 106. Where on-line operations are not available, the customer interface program 112 provides customers with access to the MSO's customer service system 108 for additional assistance.

Customer interface program 112 communicates with the customers through a web server program 114, cable modem 115, and multiple web browser programs 116. Web server program 114 and web browser programs 116 provide a standard set of protocols to carry out the communications. In the preferred embodiment, the standard protocol set includes a Hypertext Markup Language (HTML)(IAB proposed standard protocol RFC 1866) and a Secure Socket Layer (SSL) protocol, developed by Netscape Communications Corporation of Mountain View, Calif. The HTML defines the graphical user interface (GUI) used to display information to the user 102 and receive information from the user 102. The Secure Socket Layer protocol defines encryption of all information exchanged between the web server program 114 and the web browser programs 116. The encryption is necessary to maintain security for user account information and any credit card data sent across the Internet. A shell script 118 is provided between the web browser program 114 and the customer interface program 112 allowing the customer interface program 112 to be written and operated independently of any particular vendor's web server program 114.

Customer interface program 112 communications with the provisioning system 104 and the billing system 106 take place through Application Interface Programs (API's) 120 and 122 respectively. Like the shell script program 118 between the customer interface program 112 and web server program 114, the API's 120 and 122 allow the customer interface program 112 to be written and operated independently of the particular vendor's equipment used in the provisioning system 104, and in the billing system 106.

Information is kept in a customer record database 124 for each registered customer and their user premise equipment 110. The information includes, a user identification, a password and an alternate password records used during the login process, as well as a user level record used to limit access to information and functionality. Medium access control address (MAC) records for the customer's computers (not shown) and other user premise equipment 110 is also kept in the customer record database 124 to help identify when the customers have upgraded their equipment, or at least replaced the network interface cards. An API 126 is provided between the customer interface program 112 and the customer record database 124 to accommodate differences between the interfaces.

A HTML page layout database 128 is provided to store the web pages presented to the users 102. For an MSO operating in several regions of the country, the HTML layout database 128 provides commonality in the look and feel of the user interface in all regions, and it allows for common changes to be handled rapidly in all regions. The web pages should support mapping or association of dynamic content with a particular area of a web page. Provisions are included in the page designs to support marketing opportunities for enterprise and regional content, such as cross selling. Dynamic content may be customized by region where necessary.

A tool database 130 provides a set of tools that instruct or enable the customer interface program 112 to invoke, display, and process information to and from the users 102. Separating the tool software code from the customer interface program 112 software code allows the software to be managed in reasonable sizes and it allows for the integration of existing standalone tools to be integrated into the self service gateway 100.

Build Tool Program 132 provides an environment to create and maintain existing tools in the tool database 130, and web pages in the HTML page layout database 128.

The customer interface program 112 also communicates with a logging database 134. The logging database 134 provides storage for modification events, login events, and errors identified by the various tools while executing. An application program interface 136 is provided between the customer interface program 112 and the logging database 134 to account for any differences in the interfaces.

One or more network management protocol software programs 138 are provided to facilitate customer interface program 112 communications with the user premise equipment 110. The network management protocols may include Simple Network Management Protocol (IAB RFC 1157), Telenet (IAB RFC 854), and similar protocols. Network API's 140 are provided to account for differences in the interfaces between the network management protocol software programs 138 and the customer interface program 112.

Employee interface program 142 is one or more state machine software programs that step user 102 who are employees of the MSO company through various on-line operations to access the provisioning system 104, the billing system 106, and the customer service system 108. Employee interface program 142 is a duplicate of the customer interface program 112 with one different interface. For security reasons, the user identifications, passwords and alternate passwords for the employees are maintained in an employee record database 144 independent of the customer record database 124. By virtue of having different user levels, employees using the employee interface program 142 see additional information, and have access to additional functions than customers using the customer interface program 112. For example, an employee may search the logging database 134 to determine the last date and time a customer was logged onto the self service gateway 100. The web pages displayed to an employee may also show additional hyperlinks and additional help information not suitable for customers.

Figure 2:
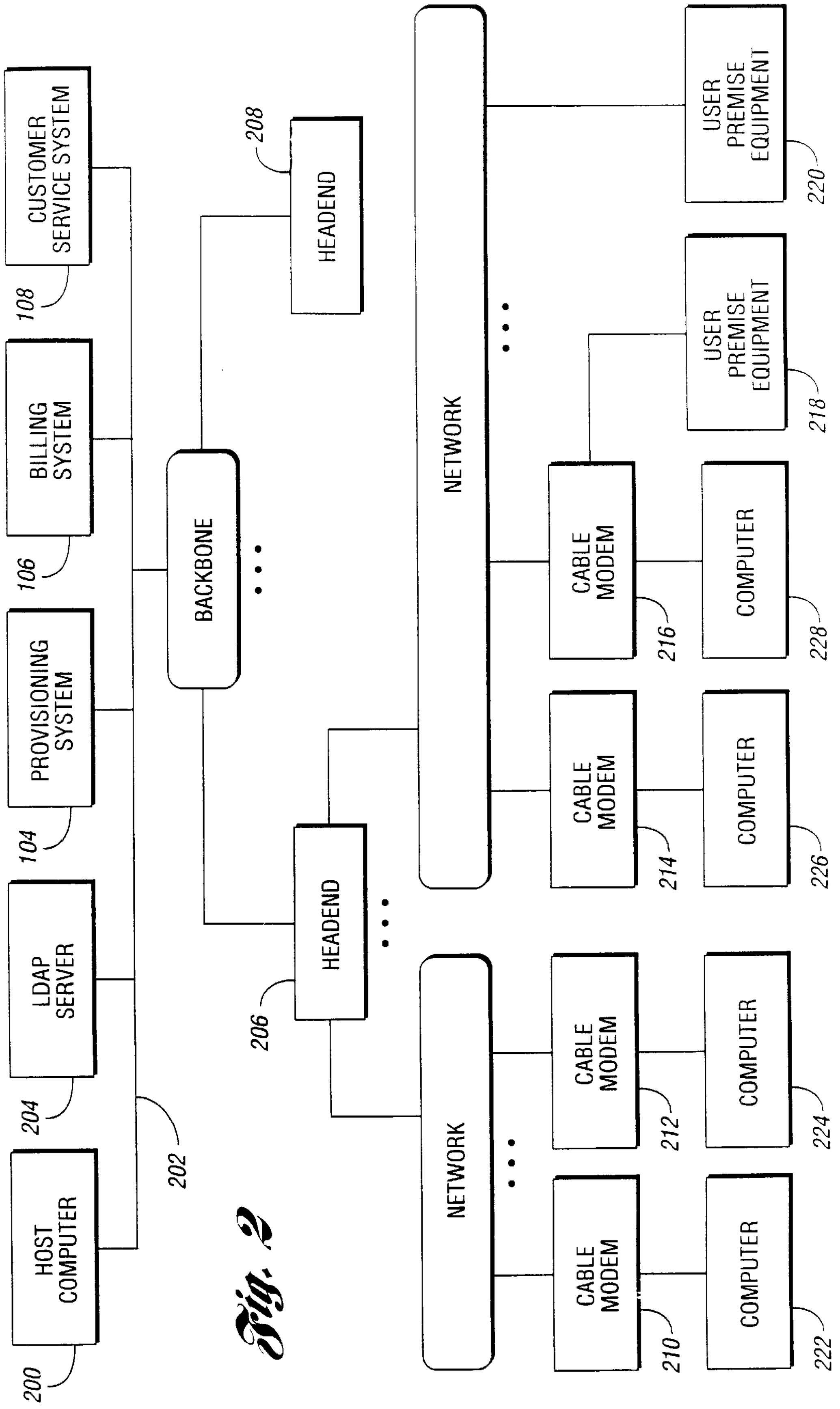
FIG. 2 is a block diagram of the hardware as seen by the software programs from FIG. 1.

FIG. 2 is a layout of the hardware environment used in connection with the present invention. Host computer 200 provides the resources for the customer interface program 112, employee interface program 142, web server program 114, network management protocol programs 138, shell script 118 and all of the API's 120, 122, 126, 136 and 140. Host computer 200 in linked to the provisioning system 104, billing system 106 and customer service system 108 by a backbone network 202. A Lightweight Directory Access Protocol (LDAP)(IAB RFC 2251) server 204 is also connected to the backbone network 202, and provides storage for the customer record database 124. Many other server types not shown, may be found on the backbone network 202, for example, Domain Name System servers, communication servers, fire wall servers, data servers, directory servers, and the like.

Backbone network 202 may be connected to other networks, network segments, and sub-networks. Two example connections are shown in FIG. 2, to headends 206 and 208. Headend 206 ultimately connects to cable modems 210–216 and user premise equipment 218–220 at the user's location. The cable modems 210–216 provide the user's computers 222–226 with access up to the backbone network 202. Headend 208 connects to other cable modems, computers and user premise equipment (not shown) in another part of the city, or in another city altogether.

Figure 3A:
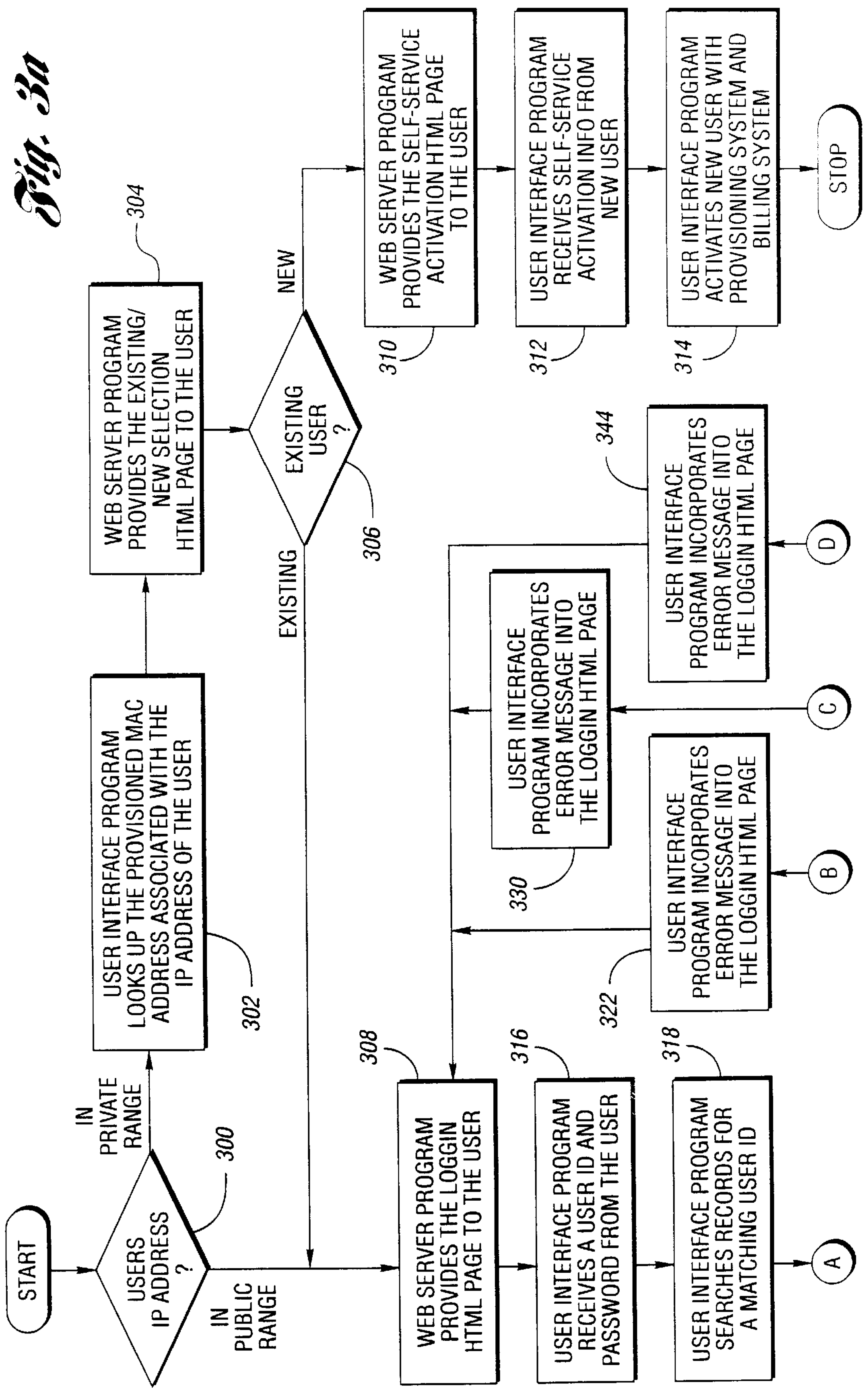
FIGS. 3*a* and 3*b* are a flow diagram of a process to login users to a provisioning system.
Figure 3B:
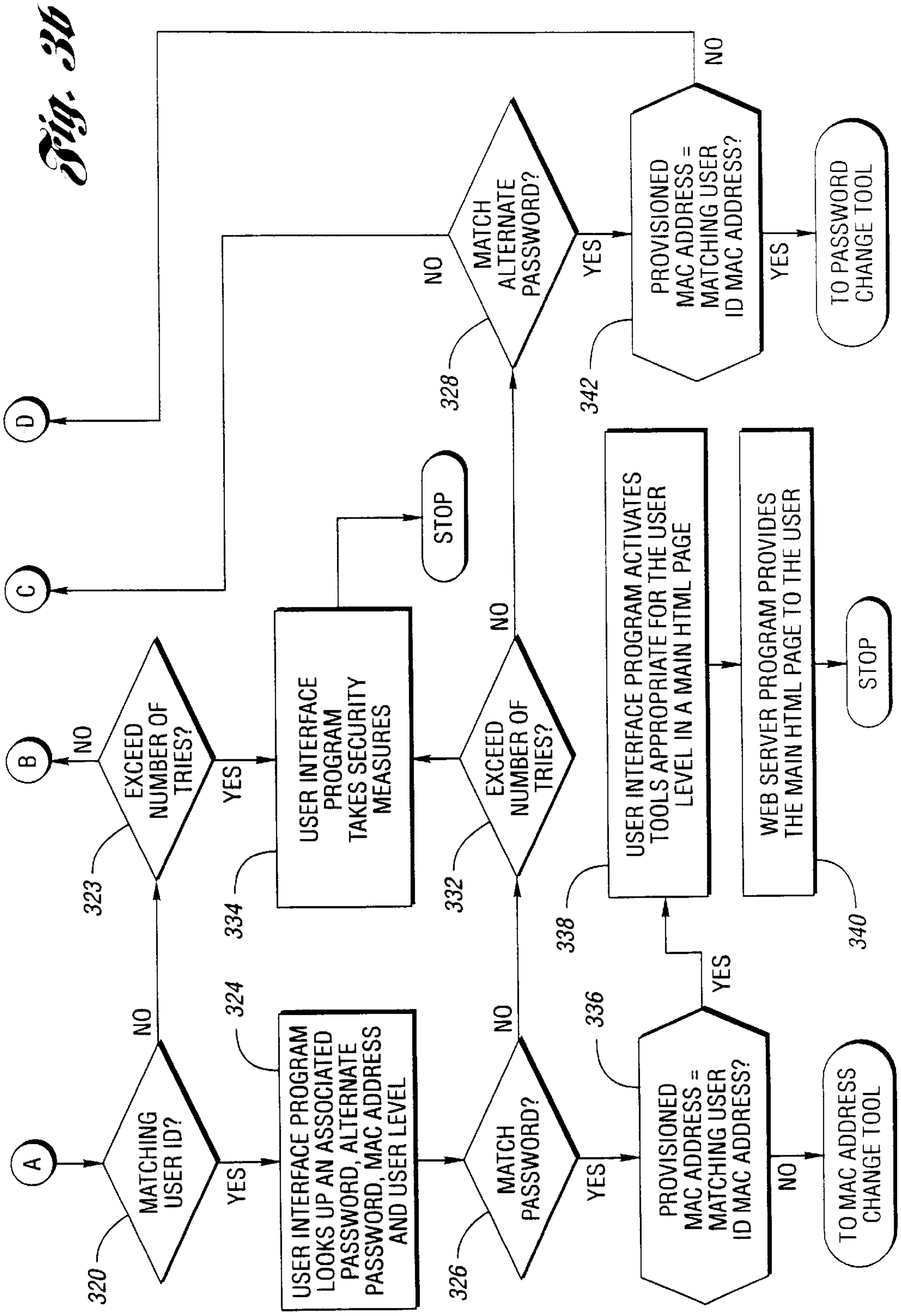

The first task of a user 102 wishing to access through the self service gateway 100 is to login. Login can take on one of three forms, public, private, and new users. In FIG. 3, each login starts by examining the Internet Protocol (IP) address supplied by the user when accessing the self service gateway 100, as shown by decision block 300. If the IP address is in the range of IP addresses allocated to the MSO, then the user 102 is on one of the MSO's private networks. If the IP address of the user 102 is not within the range allocated to the MSO, then user 102 is accessing the self service gateway 100 through a public network not controlled by the MSO. For private network users, the customer interface program 112, or employee interface program 142 (hereafter referred to as a user interface program) obtains the user's medium access control address from the provisioning system, as shown in block 302. This information will be used later in the function. Web server program 114 provides the user 102 with an existing/new user selection HTML page, as shown in block 304. The user's declaration as a new or existing user is acted upon, as shown in decision block 306. Existing private network users and public network users are provided a login HTML page, as shown in block 308. New users are provided with a self-service activation HTML page, as shown in block 310.

New users are requested to enter information about the types of service requested and billing information necessary to establish an account, as shown in block 312. After the information is provided, the user interface program passes the information along to the provisioning system 104 and billing system 106 to register the new user, as shown in block 314.

Existing users 102 logging into the self service gateway 100 must provide a user identification and a password, as shown in block 316. The user interface program then searches the customer record database 124 or the employee record database 144 as appropriate (hereafter referred to as the record database) for a match to the user identification, as shown in block 318. If no match is found, the no branch of decision block 320, then an error message in incorporated into the login HTML, as shown in block 322. Where the user enters an invalid user identification an excessive number of times, decision block 323, the user interface program takes security measures, as shown in block 334. If a matching user identification is found, then a password, an alternate password, and MAC address associated with the user identification are read from the record database, as shown in block 324. Where the entered password does not match either the database password, the no branch of decision block 326, or the alternate password, the no branch of decision block 328, then an error message is returned to the user 102, as shown in block 330. After a predetermined number of incorrect passwords are entered, the yes branch of decision block 332, then the user interface program takes security measures, block 334, to stop any further attempts by this particular user 102 from logging in.

Where the entered password matches the record database password, the yes branch of decision block 326, then the provisioned MAC address (obtained from the provisioning system 104 earlier in block 302) is compared with the MAC address stored in the record database under the user identification, as shown by decision block 336. If the two MAC addresses match, then user 102 has successfully logged in and shown the main HTML page for the self service gateway 100, as shown in blocks 338 and 340. When the two MAC addresses do not match, user interface program executes a MAC address change tool to allow the user 102 to register the new equipment using the provisioned MAC address.

From time to time users 102 forget their passwords. The self service gateway 100 accounts for this by allowing the users 102 to login using an alternate password. Since the alternate password is one that is unlikely to be forgotten, such as a child's name, birthday, or other well known phrase, it is more likely that an unauthorized user 102 will successfully guess the alternate password. To minimize the probability of an unauthorized login, the present invention will only allow an alternate password login from the computer registered with the user identification in the record database. After the entered password matches the record database alternate password, the yes branch of decision block 328, the user interface program checks the provisioned MAC address (determined in block 302 earlier) with the MAC address associated with the user identification stored in the record database, as shown in decision block 342. Where the provisioned MAC address does not match the MAC address stored in the record database, then an error message is provided to the user, as shown in block 344, and the login denied. Where the provisioned MAC address matches the MAC address stored in the record database, the user interface program executes a password change tool to prompt the user 102 to enter a new password.

The self service gateway 100 is responsive to the IP address of the users 102. The IP address indicates whether the user 102 is on a network controlled by the MSO company (a private network) or from a network controlled by some other entity (a public network). An IP address from a private network indicates that the user 102 is an existing customer, a new customer seeking to open an account, or a non-MSO user who has broken into one of the MSO's private networks. Where the provisioning system 104 allocates the IP addresses from different ranges for registered and non-registered equipment, the customer service system 100 can further distinguish what type of user with which it is dealing. An IP address indicating non-registered equipment can be used to limit an existing customer with new equipment to registering the new equipment initially, after which the limitation is removed. New customers and non-MSO users whose equipment is not registered with the provisioning system 104 may be restricted to opening new accounts only.

To open a new account and activate network service, a user 102 who is a new customer to the MSO must have the hardware and software necessary to link his computer (e.g. computer 222) to provisioning system 104. At a minimum, the user's computer must be capable of executing the web browser program 116 and communicating with the cable modem software 115 and cable modem hardware (e.g. cable modem 210). The web browser program 116 will place configuration requirements on the computer's processor type, operating system, unused storage drive space, available random access memory, and a network interface compatible with the cable modem software 115 and cable modem hardware.

Figure 4:
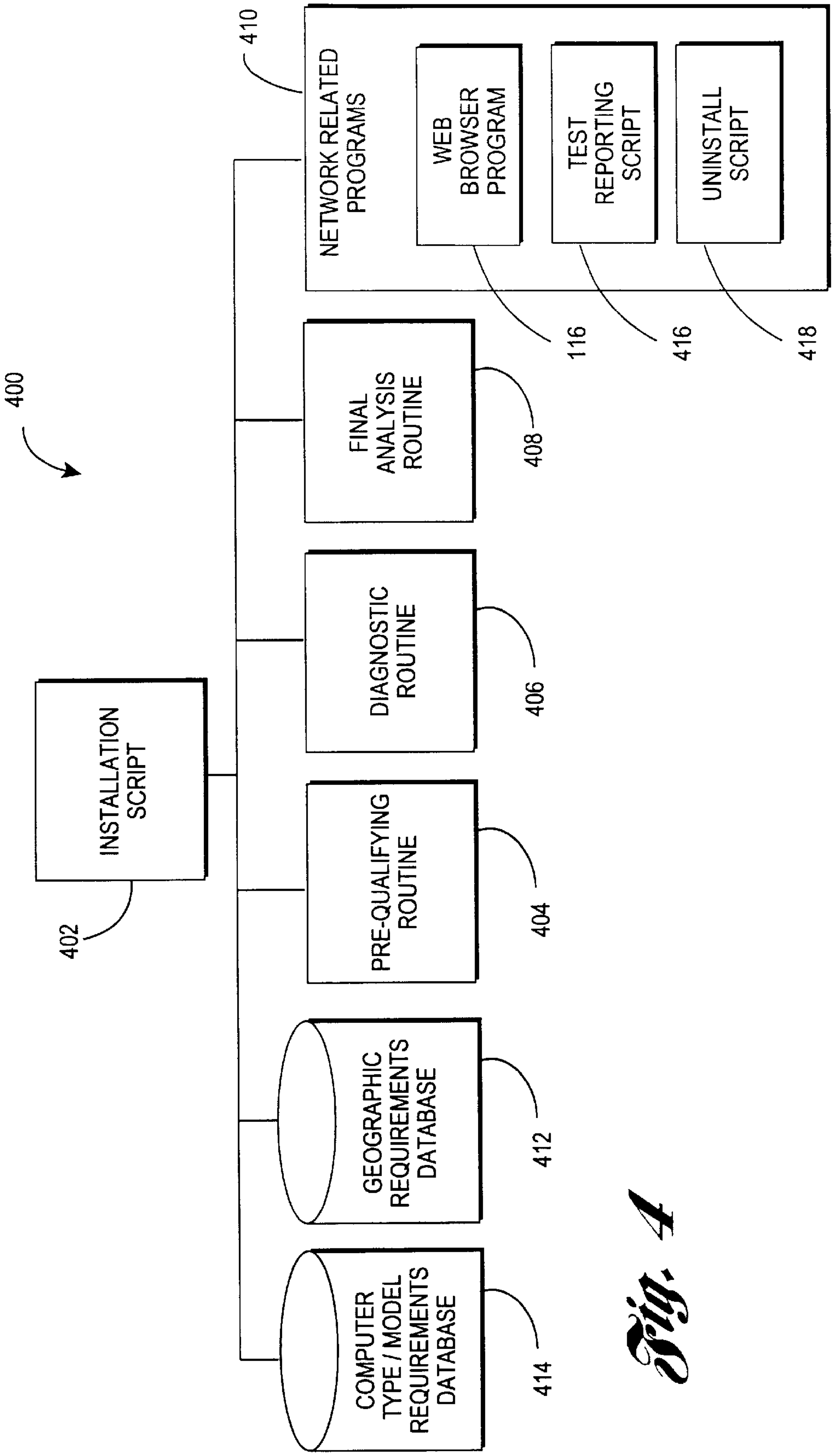
FIG. 4 is a block diagram of software programs, databases and scripts that implement the present invention.

FIG. 4 is a block diagram of the preferred embodiment of the present invention that shows the major software and information components 400 used in preparing the user's computer for network service activation. In a practical application, these major components 400 are recorded on a floppy disk, compact disk or other suitable information recording medium and distributed to new users 102. User 102 inserts the media into an appropriate drive of his computer and executes the installation script 402. Installation script 402 causes a pre-qualifying routine 404, diagnostic routine 406, and a final analysis routine 408 to be executed in sequence. If the computer is found to be capable of network service activation by the final analysis routine 408, then the installation script 402 installs at least one network related program 410 into the computer (e.g. web browser program 116). After the network related programs 410 are installed, the computer is capable of communicating with the provisioning system 104 as an unregistered guest. From this point, the user 102 is capable of communicating with the network service provider to open a new account and activate network service.

Figure 5:
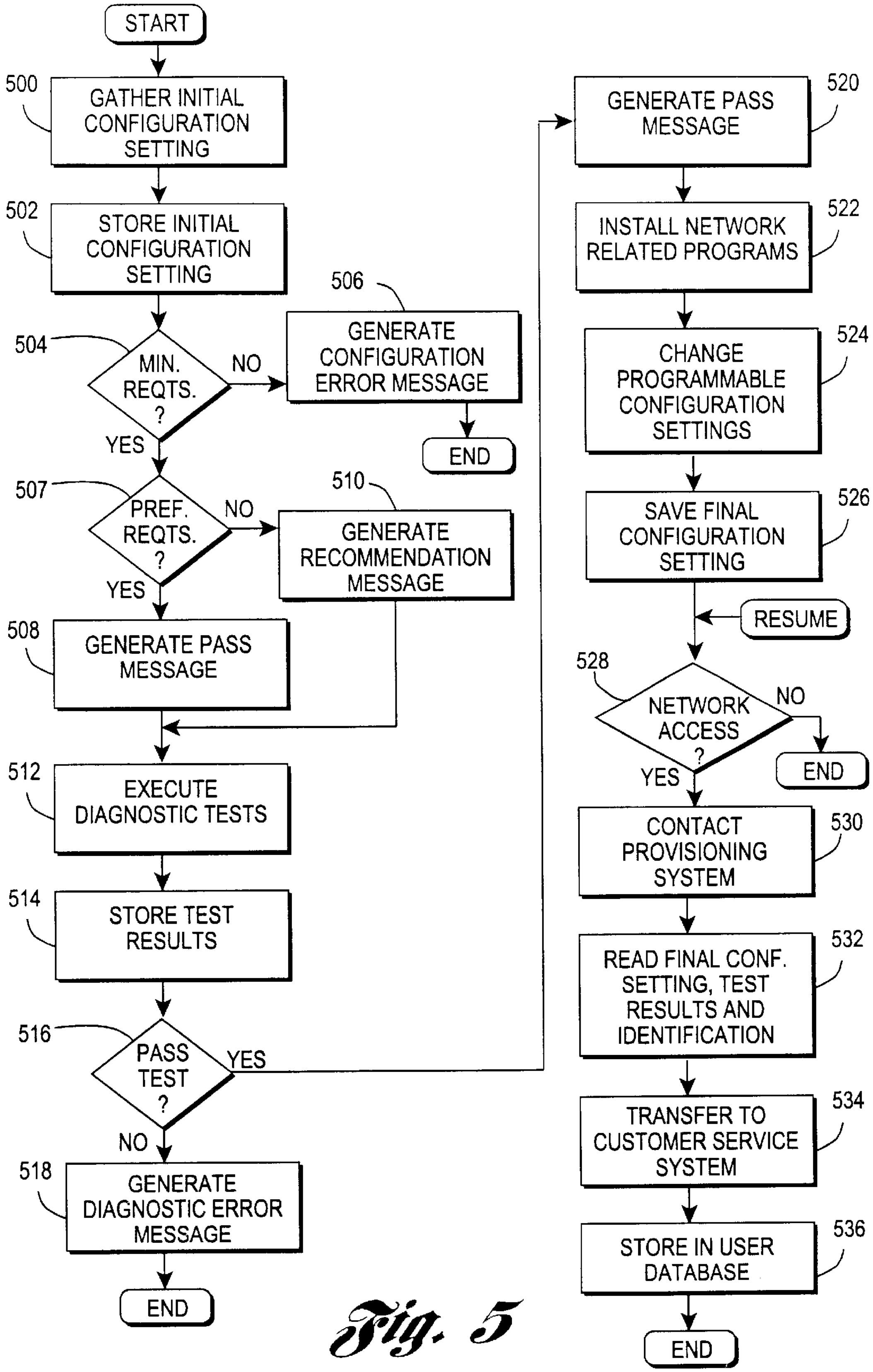
FIG. 5 is a flow diagram of a method for preparing the computer for network service activation.
Figure 6:
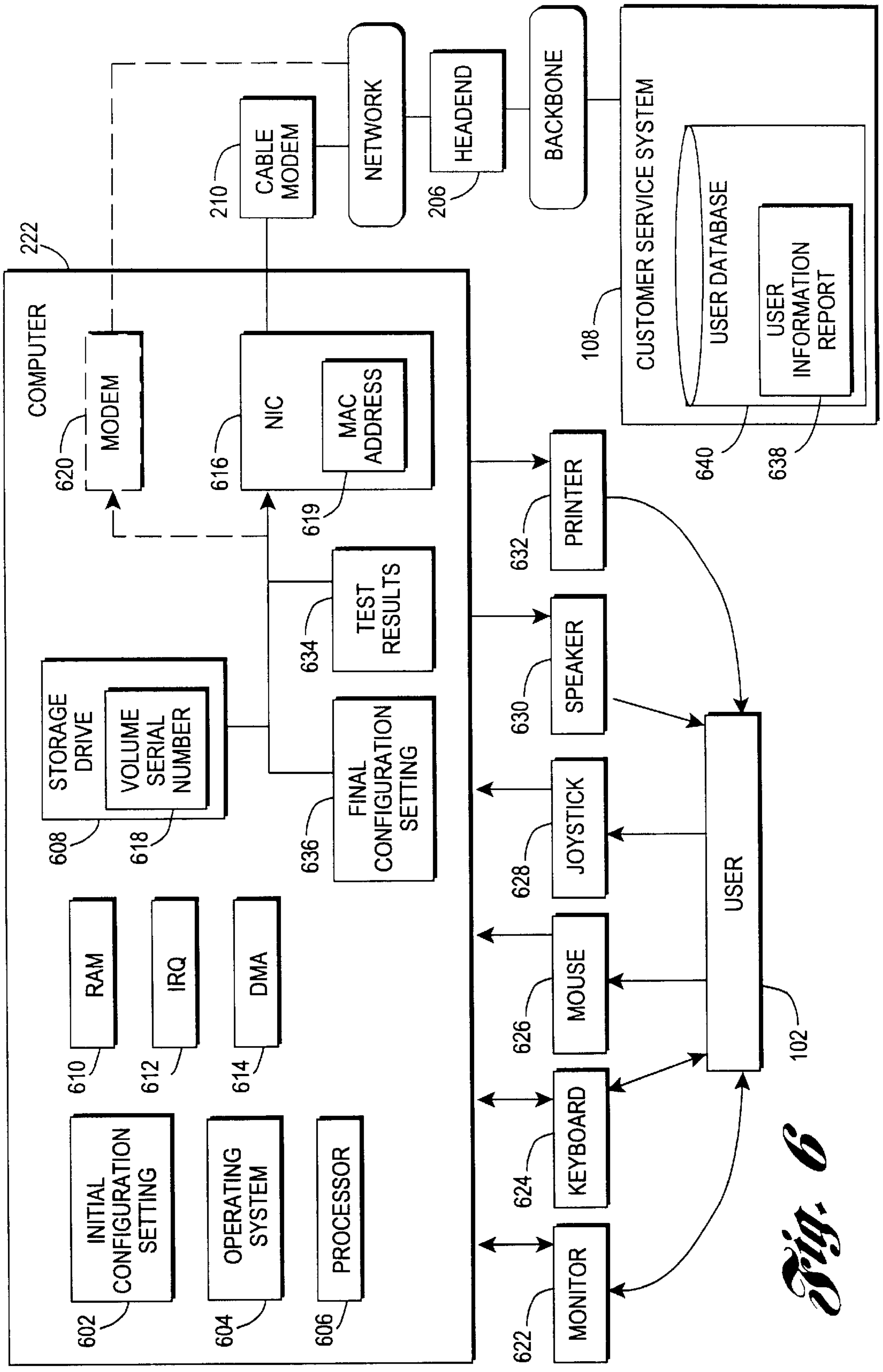
FIG. 6 is a block diagram of the items involved in preparing the computer for network service activation.

FIG. 5 is a flow diagram of a method for preparing the computer for network service activation. FIG. 6 is a block diagram showing some of the components of computer 222, which is used as an example, for the following description of FIG. 5. Referring to FIG. 5, the preparation method starts by querying predetermined aspects of the computer 222, as shown in block 500. In the preferred embodiment, this query is performed by the pre-qualification routine 404. Results of the query are gathered as an initial configuration setting and stored in an initial configuration setting file 602. The initial configuration setting file 602 is stored in the computer 222, as shown in block 502. Local preservation of the initial configuration setting provides the user 102 with a convenient reference for restoring the computer 222 to its original settings if desired. For example, the user 102 may complete the preparation procedure and then decide not to activate network services. In another example, the user 102 may have already activated network services, and then decide to end network services and return the computer 222 to the initial configuration settings.

The initial configuration setting may include one or more pieces of information regarding the hardware, software and programmable settings of the computer 222, as well as information concerning other devices connected to the computer 222. In the preferred embodiment, the initial configuration setting includes the type and version of an operation system software 604, the type and speed of a processor 606, the amount of unused storage space available on a local storage drive 608, the amount of random access memory (RAM) 610 available to the processor 606, unused interrupt request (IRQ) lines 612, unused direct memory access (DMA) channels 614, and the presence/absence of a network interface card (NIC) 616. This information is necessary to insure that any network related program 410 will have sufficient storage space in local storage drive 608, RAM 610, processor speed, an available IRQ 612, an available DMA 614, a compatible operating system 604 and access to the network to operate properly.

Other pieces of information may be included in the initial configuration setting. These other pieces of information include, but are not limited to operating system details, processor information, storage drive information, and miscellaneous information. Examples of other operating system details include a path name for a system directory, a path name for a temporary directory, and a path name for a windows directory. Other processor information may include a total number of processors, and a number of active processors in the computer 222. Storage drive information may include a path name to each local storage drive and each mounted network-based storage drive. Storage drives may be magnetic drives, tape drives, optical drives and the like. Additional information gathered for each local storage drive may include, but is not limited to a drive type (e.g. fixed, removable, optical, tape), volume name, file system implemented, volume serial number 618, total storage space, and total unused storage space. Other miscellaneous information includes a MAC address 619 of the NIC 616, the presence/absence and type of modem 620 (shown in phantom) as well as the presence/absence and type of monitor 622, keyboard 624, mouse 626, joystick 628, audio capability 630 and printer 632.

An analysis of the initial configuration setting is performed to determine if the computer's 222 initial configuration setting meet predetermined minimum requirements, as shown by decision block 504. The predetermined minimum requirements may vary depending upon the geographical location of the computer 222 as well as the computer type and model. For example, only cable modem interfaces to the network may be supported in some cities serviced by a particular network service provider while both cable modem and conventional modem interfaces to the network may be supported in other cities supported by the same network service provider. Referring to FIG. 4, geographical dependencies in the configuration setting requirements are provided in a geographic database 412. Computer type and model dependencies in the configuration setting requirements are provided in a computer type/model database 414.

Returning to FIG. 5, where one or more of the predetermined minimum requirements are not met, the NO branch of decision block 504, then a configuration error message is generated, as shown in block 506. This configuration error message is intended to be communicated to the user 102, usually through the monitor 622. Other output devices to the user 102, such as the printer 632 may also be used to communicate this and other messages. The configuration error message may include a listing of each item in the initial configuration setting that did not meet the predetermined minimum requirements. A list of recommended vendors that can supply hardware and software to solve these deficiencies may also be included in the configuration error message.

If all items of the initial configuration setting meet or exceed the predetermined minimum requirements, the YES branch of decision block 504, then the initial configuration setting may be checked against preferred requirements, as shown by decision block 507. The preferred requirements are set at levels above the predetermined minimum requirements, and are chosen to provide the user 102 with a desired level of performance. An example of a preferred requirement is the total amount of RAM installed in the computer 222. The web browser program 116 will execute properly if only a minimum amount of RAM is available, and will execute noticeably faster if the preferred amount of RAM is available. In the preferred embodiment, the preferred requirements are defined in the computer type/model database 414 and geographic database 412.

If all items of the initial configuration setting meet or exceed the preferred requirements, the YES branch of decision block 507, then a "pass" message is generated, as shown in block 508. Should one or more items fall below the preferred requirements, the NO branch of decision block 507, then an advisory message may be generated, as shown in block 510. The advisory message may include a listing of all items that meet the predetermined minimum requirements but not the preferred requirements. The advisory message may also include recommended vendors that can provide the necessary hardware and software to improve the computer 222 to the level of the preferred requirements.

Diagnostic routine 406 is then executed, as shown in block 512, to test functionality of various hardware items within the computer 222 and interfaces to external devices. For example, where pre-qualifying routine 404 determines that IRQ line number 9 (IRQ9) is unused then the diagnostic routine 406 may assert IRQ9 as part of one test to determine if this interrupt is properly recognized and serviced. In another example, the diagnostic routine 406 may attempt to write a test message (not shown) to the local storage drive 608 to verify that the local storage drive 608 is not write-protected or a read only type drive. The results of these tests are gathered as a test result and stored in a test result file 634 for preservation, as shown in block 514.

In the preferred embodiment, the diagnostic routine 406 is an off-the-shelf item that complies with a standard interface created for the test result. This approach allows multiple vendors to develop different diagnostic routines 406 for the wide variety of hardware configurations that exist in the various computers that may be linked to the network. Consequently, the network service provider is free from the burden of keeping track of, and developing diagnostic routines 406 for every new hardware item developed for computers 222 that could potentially impact network service activation and network use. Diagnostic routine 406 may also provide for manual inputs and output instructions to walk the user 102 through troubleshooting and isolation of failed items. Here too, a listing of vendors that can provide repair or replacement parts may be included in the diagnostic error message.

Final analysis routine 408 then checks the test result for any failed test, as shown by decision block 516. If one or more diagnostic test has failed, the NO branch of decision block 516, then a diagnostics error message is generated, as shown in block 518. This diagnostic error message may contain a listing of each hardware item that failed and what test detected the failure.

Where all of the tests performed by the diagnostic routine 406 pass, the YES branch of decision block 516, then another "pass" message is generated, as shown in block 520. This particular pass message informs the user 102 that all of the testable hardware elements necessary to activate network services via the computer 222 are operational. The health of untestable or untested hardware items remain unknown.

The installer script 402 then proceeds to install one or more network related programs 410 into the computer 222, as shown in block 522. As mentioned earlier, at least one of the network related programs 410 is the web browser program 116. Other programs such as plug-in extensions for the web browser program 116 and stand along application programs for audio, video, images and the like may be included in the network related programs 410. As part of the installation and/or after completion of the installation of the network related programs 410, the installer script 402 changes the appropriate programmable configuration settings to configure the computer 222 for network service activation, as shown in block 524. The updated configuration setting are also referred to as a final configuration setting that is stored in a final configuration setting file 636 within the computer 222, as shown in block 526.

In an alternative embodiment, the initial configuration setting file 602 and final configuration setting file 636 may be stored outside the computer 222. For example, where the computer 222 is connected to a local area network (not shown) then the initial configuration setting file 602 and final configuration setting file 636 may be stored on a network server (not shown), network area storage device (not shown), in a storage area network system (not shown), external drive (not shown) or any other storage device than can be written to and read by the computer 222.

Next, the installation script 402 checks for accessibility to the network, as shown in decision block 528. If the network is not accessible, the NO branch of decision block 528, then preparation of the computer 222 for network service activation ends. An example of an inaccessible network situation is a lack of wiring between the cable modem 210, or modem 620, and the network. Another example is a lack of electrical power to the cable mode 210, or modem 620. Preparation of the computer 222 may be resumed at decision block 528 at a later time to determine if network access has been established.

Once the network is accessible, the YES branch of decision block 528, then the installation script 402 communicates with the provisioning system 104 to lease a network address as an unregistered guest, as shown in block 530.

Meanwhile, contents of the final configuration setting file 636 and test result file 634, and an identifier are assembled into a user information report, as shown in block 532. The identifier may be the MAC address 619 of the NIC 616, the volume serial number 618 of the local storage drive 608, or any other identifier that is unique to each computer. After the computer 222 has obtained the network address lease, the user information report is transferred to the customer service system 108 where it is stored in a user information report file 638 within a user database 640, as shown in blocks 534 and 536 respectively. In the preferred embodiment, the transfer of the user information report file 638 is performed using a File Transfer Protocol (FTP)(IAB STD 9) with the user database 640 configured for write-only privileges via the network. This approach provides privacy for the user 102 by preventing anyone other than the network service provider from reading the user information files 638 from the user database 640. Other protocols, such as e-mail, may be used to transfer the user information report to the network service provider.

The network service provider has read privileges to the user information report file 638. The information contained therein teaches the network service provider about the type and configuration of the equipment being used by the users 102. This information is useful to the network service provider's customer service organization for repair servicing and planning purposes. A technician dispatched to the user's premise to repair the user's computer 222 can read the final configuration setting information contained within the user information report to learn about the computer 222. With this information, the technician can bring the most likely replacement parts needed to repair computer 222. This increases the probability that the technician will be able to repair computer 222 on the first service call, thus saving time and money.

Figure 7:
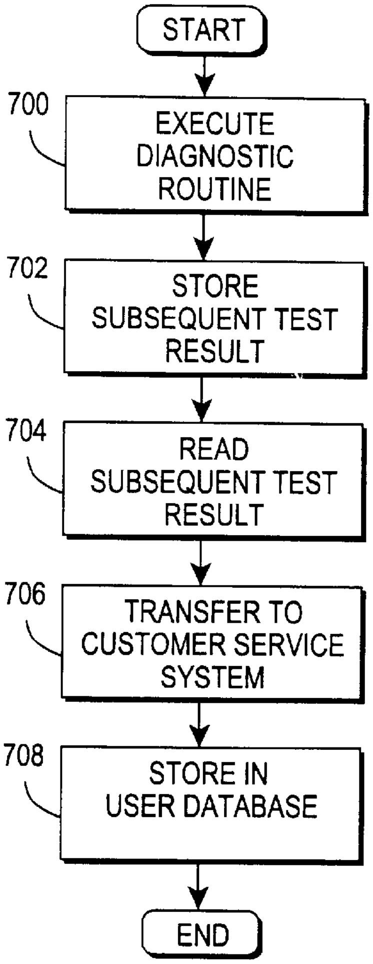
FIG. 7 is a flow diagram of a method of reporting subsequent test results.

From time to time after network service activation has been completed, user 102 will desire to execute the diagnostic routine 406 to check the health of computer 222, or to troubleshoot a problem. It is advantageous to the network service provider to automate reporting of these subsequent tests to the customer service system 108. Referring to FIG. 4, a test reporting script 416 may be provided as one of the network related programs 410 to implement automatic test result reporting. Referring to FIG. 7, executing the test reporting script 416 causes the diagnostic routine 406 to be executed, as shown in block 700. As before, the diagnostic routine 406 stores the test result in the test result file 634, as shown in block 702. The test reporting script 416 then reads the test result file 634 and transfers the test result to the customer service system 108, as shown in blocks 704 and 706 respectively. When this subsequent test result is received at the customer service system 108, it is appended to the user information report file 638 for preservation. Each additional test result appended to the user information record file 638 builds a history of the user's computer 222 over time. This history is useful to the network service provider in areas of diagnostics, prognostics, and trend spotting.

Figure 8:
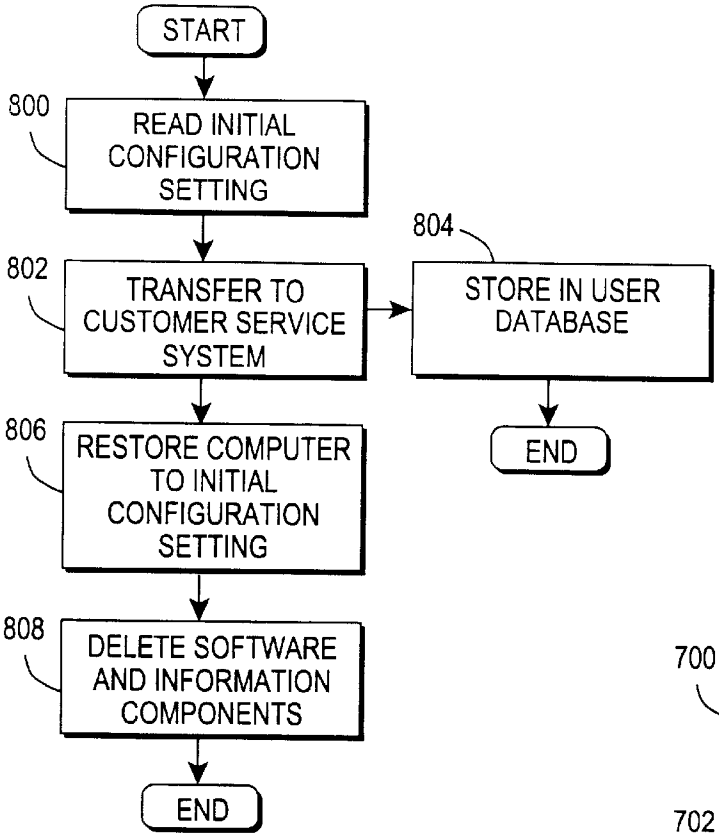
FIG. 8 is a flow diagram of a method for restoring the computer to an initial configuration.

There is a possibility that the user 102 will wish to uninstall the network related programs 410 and return the computer 222 to the initial configuration setting. This functionality is implemented by an uninstall script 418 included in the network related programs 410. Referring to FIG. 8, the uninstall script 418 reads the initial configuration setting from the initial configuration setting file 602, as shown in block 800. The initial configuration setting is then transferred to the customer service system 108, as shown in block 802, where it is added to the user information report file 638 for preservation, as shown in block 804.

After transferring the initial configuration setting, the uninstall script 418 changes the programmable configuration settings to the initial configuration setting, as shown in block 806. This change restores the configuration settings to their pre-network service activation configurations. Finally, all of the preparation software and information components 400, including the uninstall script 418, are deleted to complete the uninstall process, as shown in block 808.

To reestablish network services, user 102 may insert the information recording medium into the computer 222 and execute the installation script 402. The customer service system 108 may examine the identifier provided in the resulting user information record to determine if user 102 is an old customer reactivating their account, or a new customer seeking to establish a new account.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for preparing a computer for service activation with a network service provider, the method comprising:

querying the computer to produce an initial configuration setting regarding programmable hardware and software settings of the computer;

analyzing the initial configuration setting to determine if the initial configuration setting meets a predetermined minimum configuration setting indicative of the computer being capable of service activation with the network service provider, wherein the predetermined minimum configuration setting varies as a function of geographic location of the computer;

if the initial configuration setting meets the predetermined minimum configuration setting, testing the functionality of hardware of the computer necessary to be operational in order to enable service activation with the network service provider and producing a test result based on the testing;

analyzing the test result to determine if the hardware of the computer is operational such that the computer is capable of service activation with the network service provider;

installing at least one network related program into the computer upon determining that the computer is capable of service activation, the at least one network related program including a web browser program and enabling the computer to communicate with the network service provider as an unregistered guest in order to activate service with the network service provider;

in connection with installing the at least one network related program into the computer, updating the initial configuration setting by changing appropriate hardware and software programmable settings of the computer to produce a final configuration setting in order to configure the computer for network service activation; and transferring the final configuration setting to the network service provider for preservation.

2. The method of claim 1 further comprising storing the final configuration setting in the computer for preservation.

3. The method of claim 1 further comprising storing the initial configuration setting in the computer prior to updating the initial configuration setting to enable restoration of the computer to the initial configuration setting.

4. The method of claim 1 further comprising transferring the test result to the network service provider for preservation.

5. The method of claim 1 further comprising:

testing the computer after service activation with the network service provider to produce a subsequent test result; and transferring the subsequent test result to the network service provider for preservation.

6. The method of claim 1 further comprising:

analyzing the initial configuration setting to determine if the computer meets a preferred requirement in response to querying the computer; and generating a recommendation message in response to determining that the computer is capable of service activation and that the initial configuration setting is deficient as compared to the preferred requirement to inform a user of the computer.

7. The method of claim 1 further comprising generating an error message in response to determining that the computer is deficient for service activation to inform a user of the computer.

8. An information recording medium for use in a computer to enable service activation of the computer with a network service provider, the information recording medium recording a computer program that is readable and executable by the computer, the computer program comprising:

querying the computer to produce an initial configuration setting regarding programmable hardware and software settings of the computer;

analyzing the initial configuration setting to determine if the initial configuration setting meets a predetermined minimum configuration setting indicative of the computer being capable of service activation with the network service provider, wherein the predetermined minimum configuration setting varies as a function of geographic location of the computer;

if the initial configuration setting meets the predetermined minimum configuration setting, testing the functionality of hardware of the computer necessary to be operational in order to enable service activation with the network service provider to produce and producing a test result based on the testing;

analyzing the test result to determine if the hardware of the computer is operational such that the computer is capable of service activation with the network service provider;

installing at least one network related program into the computer upon determining that the computer is capable of service activation, the at least one network related program including a web browser program and enabling the computer to communicate with the network service provider as an unregistered guest in order to activate service with the network service provider;

in connection with installing the at least one network related program into the computer, updating the initial configuration setting by changing appropriate hardware and software programmable settings of the computer to produce a final configuration setting in order to configure the computer for network service activation; and transferring the final configuration setting to the network service provider for preservation.

9. The information recording medium of claim 8 wherein the computer program further comprises storing the final configuration setting in the computer for preservation.

10. The information recording medium of claim 8 wherein the computer program further comprises storing the initial configuration setting in the computer prior to updating the initial configuration setting to enable restoration of the computer to the initial configuration setting.

11. The information recording medium of claim 8 wherein the computer program further comprises transferring the test result to the network service provider for preservation.

12. The information recording medium of claim 8 wherein the computer program further comprises:

testing the computer after service activation with the network service provider to produce a subsequent test result; and transferring the subsequent test result to the network service provider for preservation.

13. The information recording medium of claim 8 wherein the computer program further comprises:

analyzing the initial configuration setting to determine if the computer meets a preferred requirement in response to querying the computer; and generating a recommendation message in response to determining that the computer is capable of service activation and that the initial configuration setting is deficient as compared to the preferred requirement to inform a user of the computer.

14. The information recording medium of claim 8 wherein the computer program further comprises generating an error message in response to determining that the computer is deficient for service activation to inform a user of the computer.

15. The method of claim 1 wherein:

the initial configuration setting regarding the programmable hardware and software settings of the computer includes information regarding computer operation system software, computer processor, computer local storage drive storage space, computer random access memory, and computer network interface device.

16. The method of claim 15 wherein:

the predetermined minimum configuration setting is set at a level to ensure that a computer running a network related program has computer operation system software compatible with the network related program and has sufficient computer processor speed, computer local storage drive storage space, computer random access memory, and computer network interface device access to run the network related program.

17. The information recording medium of claim 8 wherein:

the initial configuration setting regarding the programmable hardware and software settings of the computer includes information regarding at least one of computer operation system software, computer processor, computer local storage drive storage space, computer random access memory, and computer network interface device.

18. The information recording medium of claim 17 wherein:

the predetermined minimum configuration setting is set at a level to ensure that a computer running a network related program has computer operation system software compatible with the network related program and has sufficient computer processor speed, computer local storage drive storage space, computer random access memory, and computer network interface device access to run the network related program.

* * * * *